(12) United States Patent
Wu et al.

(10) Patent No.: US 8,866,778 B2
(45) Date of Patent: Oct. 21, 2014

(54) METHOD OF DETECTING FLOATING MODE OF A TOUCH PANEL

(71) Applicant: Elan Microelectronics Corporation, Hsin Chu (TW)

(72) Inventors: Chia-Mu Wu, Taipei (TW); Tse-Lun Hung, Taipei (TW); Shun-Yi Chen, Taoyuan (TW); Jung-Shou Huang, Zhubei (TW)

(73) Assignee: Elan Microelectronics Corporation, Hsin Chu (TW)

( * ) Notice: Subject to any disclaimer, the term of this patent is extended or adjusted under 35 U.S.C. 154(b) by 88 days.

(21) Appl. No.: 13/718,963

(22) Filed: Dec. 18, 2012

(65) Prior Publication Data

US 2013/0176280 A1    Jul. 11, 2013

(30) Foreign Application Priority Data

Jan. 6, 2012    (TW) .............................. 101100581 A (51) Int. Cl.
  *G06F 3/041*    (2006.01)
  *G06F 3/044*    (2006.01)
(52) U.S. Cl.
  CPC .............. *G06F 3/044* (2013.01); *G06F 3/0416* (2013.01)
  USPC ....................................................... 345/173
(58) Field of Classification Search
  CPC ........................ G06F 3/044; G06F 2203/04104
  USPC ................................................... 345/173–178
  See application file for complete search history.

(56) References Cited

U.S. PATENT DOCUMENTS

| | | | |
|---|---|---|---|
| 6,323,846 B1 * | 11/2001 | Westerman et al. | 345/173 |
| 7,999,793 B2 * | 8/2011 | Wang | 345/173 |
| 8,581,879 B2 * | 11/2013 | Vieta | 345/174 |
| 8,749,512 B2 * | 6/2014 | Westerman et al. | 345/174 |
| 2008/0158185 A1 * | 7/2008 | Westerman | 345/173 |
| 2009/0160787 A1 * | 6/2009 | Westerman et al. | 345/173 |
| 2010/0188364 A1 * | 7/2010 | Lin et al. | 345/174 |
| 2013/0141363 A1 * | 6/2013 | Hung et al. | 345/173 |
| 2014/0071092 A1 * | 3/2014 | Shih et al. | 345/175 |

* cited by examiner

*Primary Examiner* — Liliana Cerullo
(74) *Attorney, Agent, or Firm* — patenttm.us (57) ABSTRACT

A method of detecting floating mode of a touch panel has steps of reading a sensing cluster and presetting a detection window; taking each sensing point of the sensing cluster as a center point of the detection window; after determining that the center point has a negative sensing value qualifying to be generated under a floating mode, further determining a count of the sensing points other than the center point having the sensing values generated under a grounding mode and incrementing an accumulative number by one if the count exceeds a first critical value; keeping incrementing the accumulative number until each sensing point in the sensing cluster has been taken as the center point of the detection window for scanning; and determining if the accumulative number exceeds a second critical value, and if positive, further determining that the current sensing cluster is generated under the floating mode.

29 Claims, 6 Drawing Sheets

| (N) | | | |
|---|---|---|---|
| 0 | 0 | 0 | |
| 0 | 75 | 62 | |
| 90 | 115 | 113 | |
| 187 | -150 | -100 | 143 |
| 7 | 135 | 112 | |

| (N+1) | | | |
|---|---|---|---|
| 0 | 0 | 0 | |
| | 75 | 62 | 0 |
| 90 | 115 | 113 | 0 |
| 187 | -150 | -100 | 143 |
| 7 | 135 | 112 | |

METHOD OF DETECTING FLOATING MODE OF A TOUCH PANEL

BACKGROUND OF THE INVENTION

1. Field of the Invention

The present invention relates to a method of detecting floating mode of a touch panel and more particularly to a method of detecting floating mode of sensing clusters of a capacitive touch panel generated under the floating mode.

2. Description of the Related Art

The touch concept of a capacitive touch panel is an approach detecting positions touched by users according to capacitance variations changed by static electricity on human body. To effectively respond to the signal of static electricity on human body, a metal housing generally used by a capacitive touch panel is connected to a grounding signal of the capacitive touch panel to constitute an electric ground structure so that users' hands are definitely in contact with the capacitive touch panel.

The widespread tablet personal computers (PC) and smart phones with large screens allow users to touch the touch panels of the electronic equipment with fingers or palms only. However, because of the ungrounded nature, irregular capacitance variations of the touch panels arise from the operation of the ungrounded touch panels or a floating mode of the touch panels.

Figure 6A:
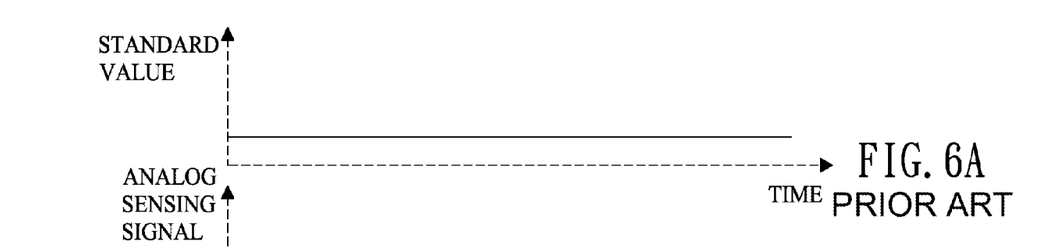
FIG. 6A is a waveform diagram of a preset base value of a conventional touch panel.
Figures 6B, 6C:
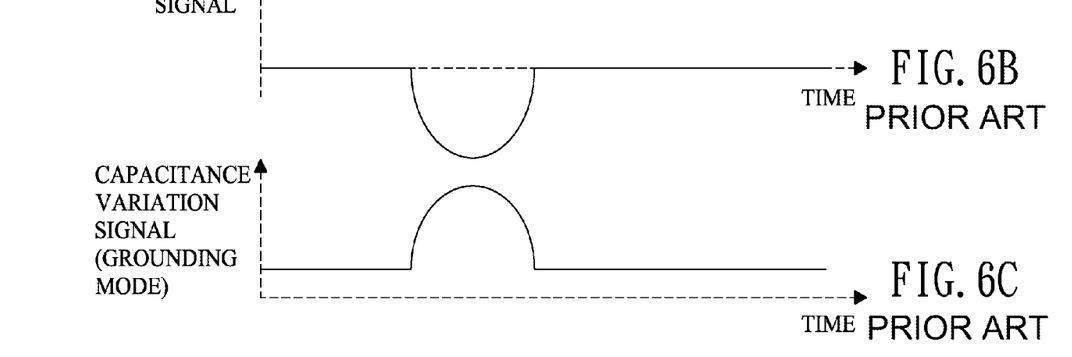
FIG. 6B is a waveform diagram of an analog sensing signal of the conventional touch panel in FIG. 6A touched under the grounding mode.
FIG. 6C is a waveform diagram of a capacitance variation of the conventional touch panel in FIG. 6A touched under the grounding mode.
Figure 7A:
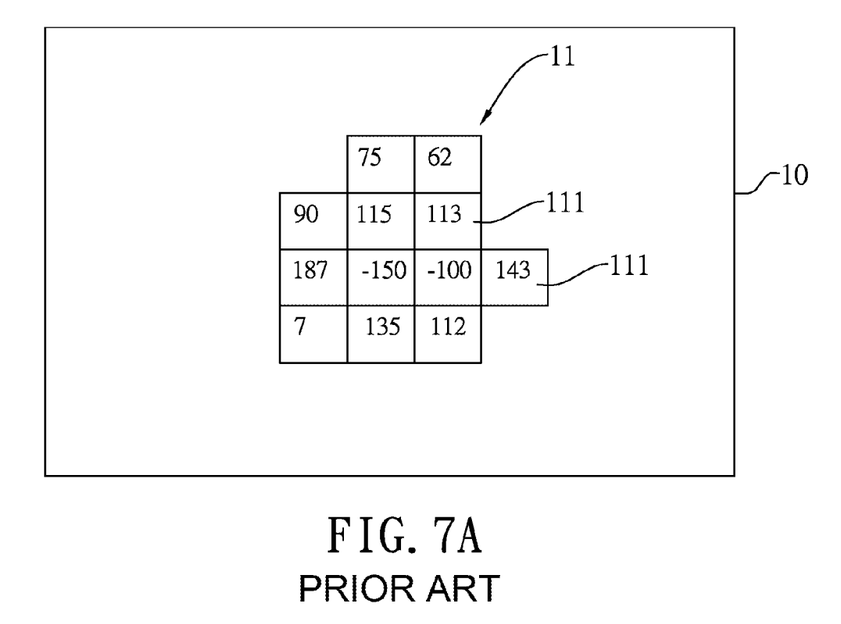
FIG. 7A is a schematic view of a sensing cluster of a conventional touch panel outputted under the grounding mode.

With reference to FIGS. 6A to 6C, when a capacitive touch panel is operated under a grounding mode, a touch event generates an analog sensing signal variation. A value of capacitance variation (dV value) is obtained by subtracting a magnitude of the analog sensing signal from a preset base value of the touch panel and the peak value of the capacitance variation is positive. With reference to FIG. 7A, in a sensing frame 10 with full-frame sensors detecting continuously reporting hexadecimal sensing values, the sensing values of a sensing cluster 11 corresponding to the capacitance variation are shown.

Figure 6D:
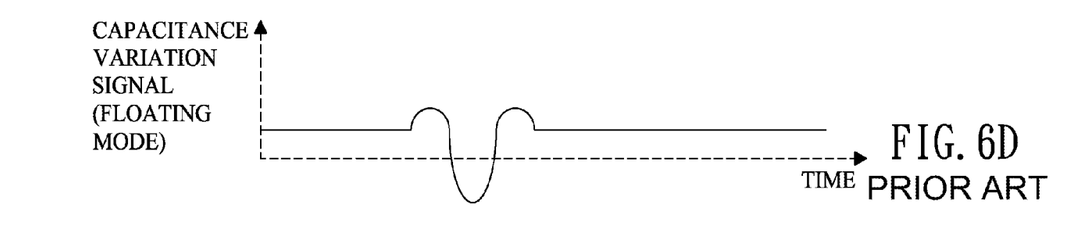
FIG. 6D is a waveform diagram of a capacitance variation of the conventional touch panel in FIG. 6A touched under the floating mode.
Figure 7B:
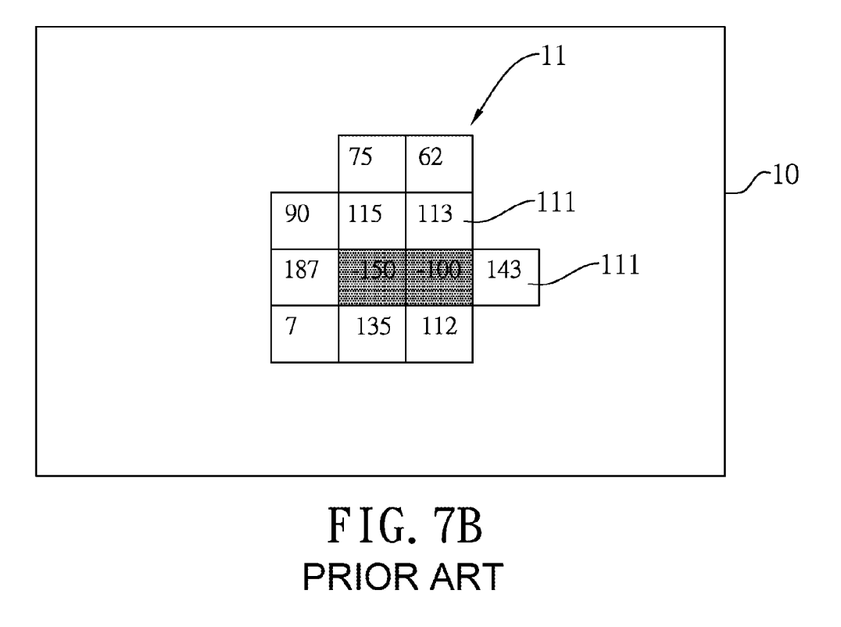
FIG. 7B is a schematic view of a sensing cluster of a conventional touch panel outputted under the floating mode.

With reference to FIG. 6D, if the touch event takes place under the floating mode, the peak value of the values of capacitance variation (dV value) is negative. With reference to FIG. 7B, in a sensing frame 10 with full-frame sensors detecting continuously reporting hexadecimal sensing values, the sensing values of central sensing points 111 of the sensing cluster 11 are negative, namely −150 and −100 (hexadecimal values). As the coordinates of a touch object are determined by the maximum value of the sensing cluster, the direct impact is incorrectly determined coordinates caused by the irregular capacitance variation.

Hence, the error rate of identifying touch objects increases if capacitive touch panels are operated under the floating mode.

SUMMARY OF THE INVENTION

An objective of the present invention is to provide a method of detecting floating mode of a touch panel capable of correctly determining a sensing cluster generated under the floating mode for the purpose of subsequent compensation and avoiding erroneous determination of the coordinates of a touch object detected under the floating mode.

To achieve the foregoing objective, the method of detecting floating mode of a touch panel has steps of:

reading a sensing cluster and presetting a detection window;

taking each sensing point of the sensing cluster as a center point of the detection window to perform scanning;

after determining that the center point has a negative sensing value qualifying to be generated under a floating mode, further determining a count of the sensing points other than the center point having the sensing values generated under a grounding mode and incrementing an accumulative number by one if the count exceeds a first critical value;

keeping incrementing the accumulative number until each sensing point in the sensing cluster has been taken as the center point of the detection window for scanning; and determining if the accumulative number exceeds a second critical value, and if positive, further determining that the current sensing cluster is generated under the floating mode.

The present invention employs the detection window to scan a sensing cluster. As the central sensing points of the sensing cluster in the detection window have a negative peak value and other sensing points in the detection window have a normal distribution of the sensing values, the sensing cluster can satisfy the foregoing steps and can be correctly considered as one sensing value generated under the floating mode.

Other objectives, advantages and novel features of the invention will become more apparent from the following detailed description when taken in conjunction with the accompanying drawings.

DETAILED DESCRIPTION OF THE INVENTION

Figure 1:
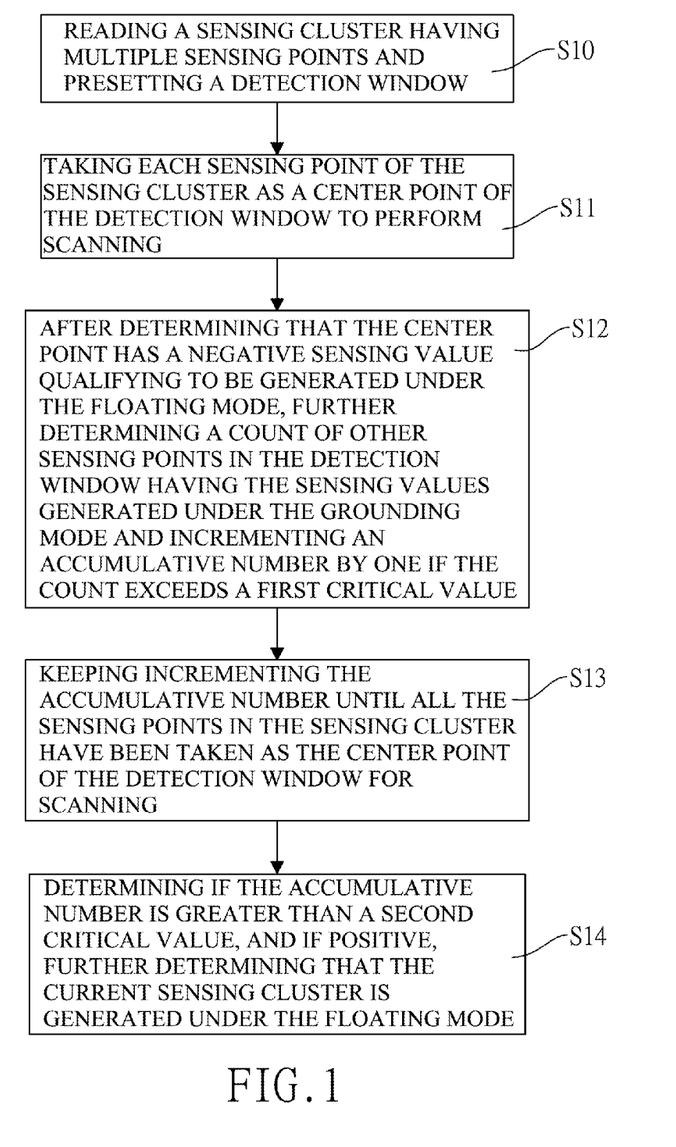
FIG. 1 is a first embodiment of a method of detecting floating mode of a touch panel in accordance with the present invention.
Figure 2:
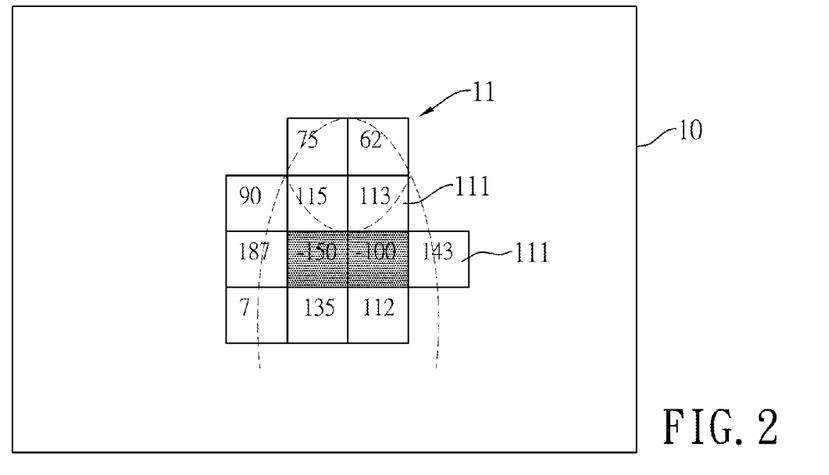
FIG. 2 is a schematic view of a sensing cluster of a touch panel outputted under the floating mode in accordance with the present invention.

With reference to FIGS. 1 and 2, a first embodiment of a method of detecting floating mode of a touch panel in accordance with the present invention has the following steps.

Step S10: Read a sensing cluster 11 having multiple sensing points 111 and preset a detection window. In the present embodiment, the sensing cluster is obtained from a scanned sensing frame. The size of the detection window preferably corresponds to that of a matrix containing corresponding number of capacitance sensing unit and matching the size of a finger. Given a touch panel with capacitance sensing units spaced apart by a gap in a range of 5.3 mm~4.5 mm as an example, the detection window matches a 3×3 matrix in size.

Figure 3A:
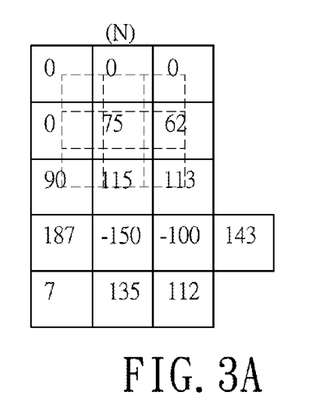
FIGS. 3A to 3D are flow diagrams of the sensing cluster in FIG. 2 when the sensing cluster is scanned.
Figure 3B:
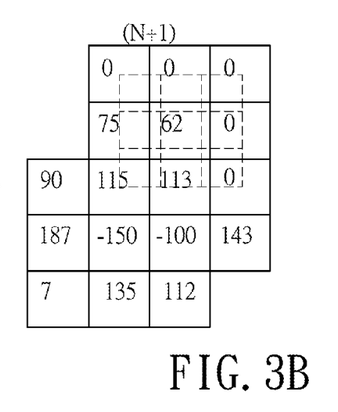
Figure 3C:
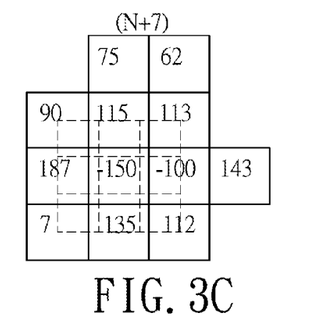
Figure 3D:
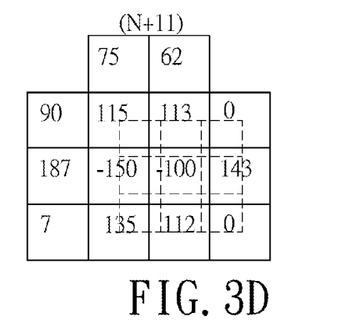

Step S11: Take each sensing point 111 of the sensing cluster 11 as a center point of the detection window to perform scanning. With reference to FIG. 3A, the detection window having the 3×3 matrix corresponds to 9 sensing points 111 of the sensing cluster 11.

Step 12: After determining that the center point has a negative sensing value qualifying to be generated under the floating mode, further determine a count of other sensing points in the detection window having the sensing values generated under the grounding mode and increment an accumulative number by one if the count exceeds a first critical value. In the present embodiment, the first critical value is not less than 2. The sensing value of any sensing point having no sensing value in the detection window is replaced by a zero.

Step 13: Keep incrementing the accumulative number until all the sensing points in the sensing cluster have been taken as the center point of the detection window for scanning.

Step 14: Determine if the accumulative number is greater than a second critical value, and if positive, further determine that the current sensing cluster is generated under the floating mode. In the present embodiment, the second critical value is not less than 2.

For a sensing cluster 11 generated under the floating mode, only the central sensing points 111 at the center of the sensing cluster 11 have negative sensing values. With reference to FIGS. 3A to 3D, the sensing cluster 11 is detected for 12 times by taking each sensing point in the sensing cluster 11 as a center point of the detection window, and the central sensing points have two negative values, namely −150 and −100 (hexadecimal values). Hence, at least two detection windows with the respective central sensing points as the center points are applied for detection, and the condition exceeding the first critical value is met and the condition exceeding the second critical value is also met. Accordingly, the current sensing cluster 11 shown in FIG. 2 is generated under the floating mode.

Figure 4:
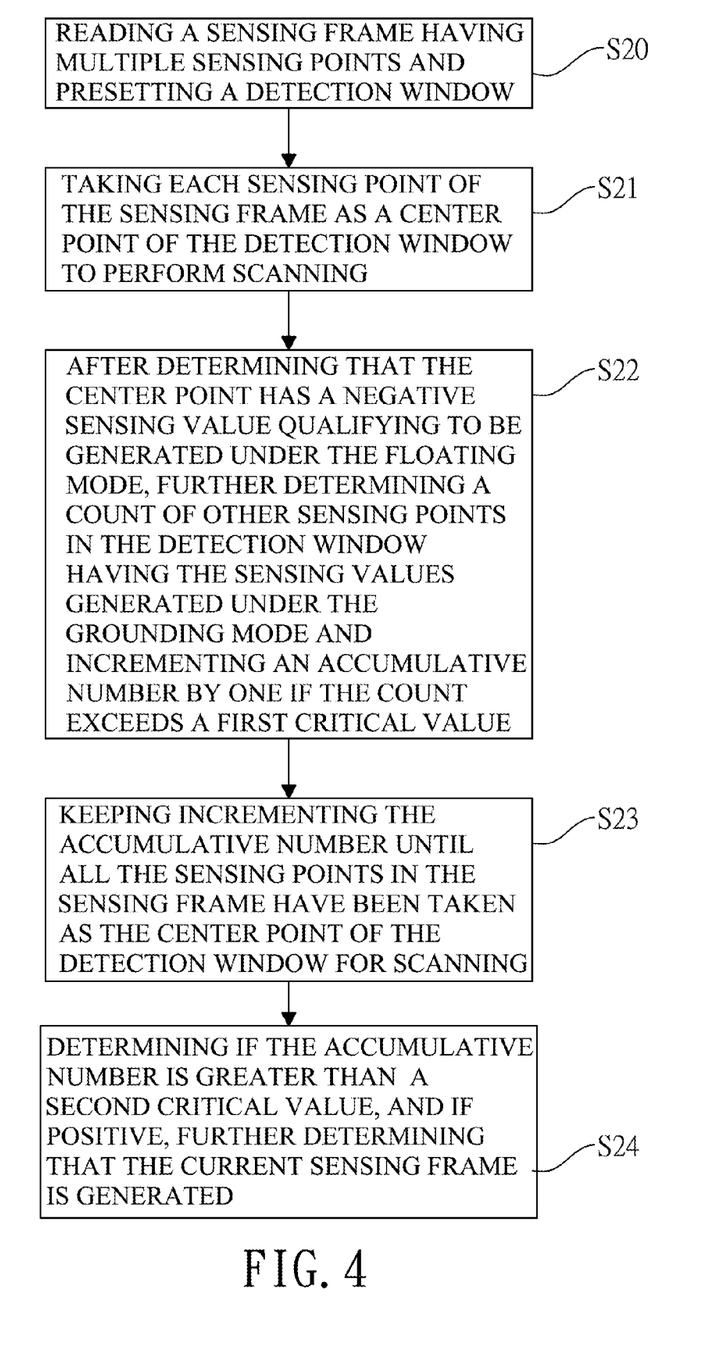
FIG. 4 is a second embodiment of a method of detecting floating mode of a touch panel in accordance with the present invention.

The foregoing detection only focuses on if a single sensing cluster is generated under the floating mode. With reference to FIG. 4, given a sensing frame with full-frame sensors, a second embodiment of a method of detecting floating mode in accordance with the present invention has the following steps.

S20: Read a sensing frame having multiple sensing points and preset a detection window. In the present embodiment, the size of the detection window preferably corresponds to that of a matrix containing corresponding number of capacitance sensing unit and matching the size of a finger. Given a touch panel with capacitance sensing units spaced apart by a gap in a range of 5.3 mm~4.5 mm as an example, the detection window matches a 3×3 matrix in size.

Step S21: Take each sensing point of the sensing frame as a center point of the detection window to perform scanning. With reference to FIG. 3A, the detection window having the 3×3 matrix corresponds to 9 sensing points 111 of the sensing frame 10.

Step 22: After determining that the center point has a negative sensing value qualifying to be generated under the floating mode, further determine a count of other sensing points in the detection window having the sensing values generated under the grounding mode and increment an accumulative number by one if the count exceeds a first critical value. In the present embodiment, the first critical value is not less than two. The sensing value of any sensing point having no sensing value in the detection window is replaced by a zero.

Step 23: Keep incrementing the accumulative number until all the sensing points in the sensing frame have been taken as the center point of the detection window for scanning.

Step 24: Determine if the accumulative number is greater than a second critical value, and if positive, further determine that the current sensing frame is generated under the floating mode. In the present embodiment, the second critical value is not less than two.

Figure 5:
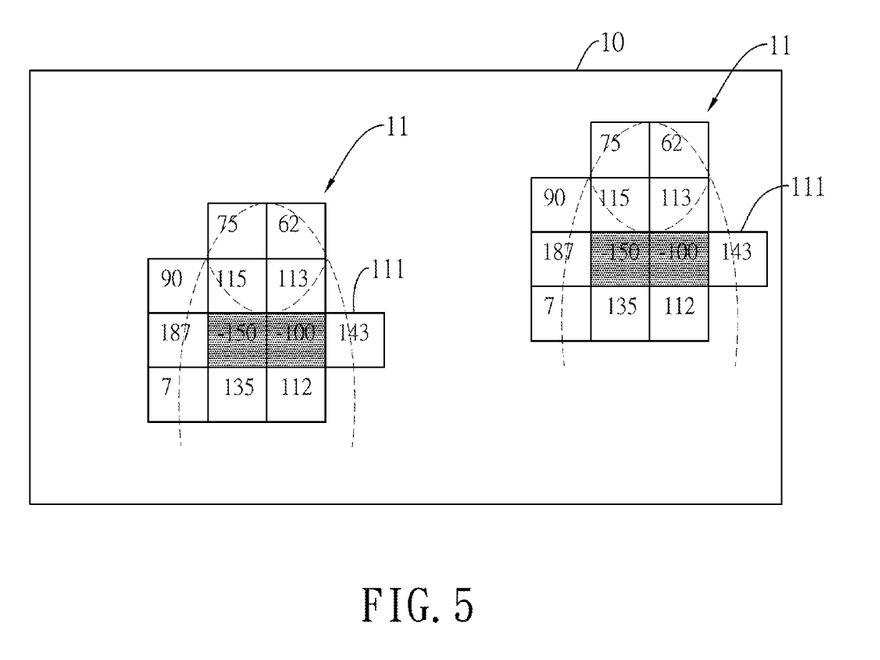
FIG. 5 is a schematic view of multiple sensing clusters of a touch panel generated by corresponding touch objects under the floating mode in accordance with the present invention.

With reference to FIG. 5, a sensing frame 10 generated under the floating mode has two sensing clusters 11. In the present embodiment, all the sensing points 111 in the sensing frame 10 are scanned by the detection window. Likewise, as the sensing values of the central sensing points in the detection window are far less than those of other sensing points in the detection window, the comparison condition associated with the first critical value and the second critical value can thus be met. Accordingly, a sensing frame generated under the floating mode can be correctly detected.

In step 12, a first floating margin can be set up for determining if a sensing value is less than the first floating margin. If positive, the sensing value is considered as one sensing value generated under the floating mode. Besides, a second floating margin is set up to be less than the first floating margin for determining if a sensing value falls within the second floating margin and the first floating margin. If positive, the sensing value is considered as one sensing value generated under the floating mode. Similarly, a first grounding margin is set up for determining if a sensing value is greater than the first grounding margin. If positive, the sensing value is considered as one sensing value generated under the grounding mode. Besides, a second grounding margin is set up for determining if a sensing value falls within the first grounding margin and the second grounding margin. If positive, the sensing value is considered as one sensing value generated under the grounding mode. By setting up the first floating margin to be less than a negative noise threshold and the first grounding margin to be greater than a positive noise threshold, erroneous determination result arising from noise interference can be ruled out.

In sum, the present invention can correctly determine if the current sensing cluster or the sensing frame is generated under the floating mode. Subsequent compensation can be performed based on the determination result and helps identify the coordinates of a touch object detected under the floating mode.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of detecting floating mode of a touch panel, comprising steps of:
    (a) reading a sensing cluster having multiple sensing points and presetting a detection window;
    (b) taking each sensing point of the sensing cluster as a center point of the detection window to perform scanning;
    (c1) determining whether the center point has a negative sensing value less than a first floating margin, when positive, proceeding step (c2)
    (c2) determining a count of other sensing points in the detection window having the sensing values greater than a first grounding margin, incrementing an accumulative number by one when the count exceeds a first critical value;
(d) repeating step (c1) until all the sensing points in the sensing cluster have been taken as the center point of the detection window for scanning; and
(e) when the accumulative number is greater than a second critical value, determining the current sensing cluster is generated under a floating mode.

2. The method as claimed in claim 1 further setting up a second floating margin being less than the first floating margin before proceeding step (c1), wherein in step (c1) determining whether a negative sensing value falls within the second floating margin and the first floating margin, and when positive, proceeding step (c2).

3. The method as claimed in claim 1 further setting up a second grounding margin being greater than the first grounding margin, wherein in step (c2) determining a count of other sensing points in the detection window having the sensing values fall within the first grounding margin and the second grounding margin.

4. The method as claimed in claim 2 further setting up a second grounding margin being greater than the first grounding margin, wherein in step (c2) determining a count of other sensing points in the detection window having the sensing values fall within the first grounding margin and the second grounding margin.

5. The method as claimed in claim 2, wherein the first floating margin is less than a negative noise threshold.

6. The method as claimed in claim 3, wherein the first grounding margin is greater than a positive noise threshold.

7. The method as claimed in claim 4, wherein the first grounding margin is greater than a positive noise threshold.

8. The method as claimed in claim 1, wherein the first critical value is not less than two, and the second critical value is not less than two.

9. The method as claimed in claim 2, wherein the first critical value is not less than two, and the second critical value is not less than two.

10. The method as claimed in claim 3, wherein the first critical value is not less than two, and the second critical value is not less than two.

11. The method as claimed in claim 4, wherein the first critical value is not less than two, and the second critical value is not less than two.

12. A method of detecting floating mode of a touch panel, comprising steps of:
(a) reading a sensing frame and presetting a detection window;
(b) taking each of multiple sensing points selected from the sensing frame as a center point of the detection window to perform scanning;
(c1) determining whether the center point has a negative sensing value less than a first floating margin, when positive, proceeding step (c2)
(c2) determining a count of other sensing points in the detection window having the sensing values greater than a first grounding margin and incrementing an accumulative number by one when the count exceeds a first critical value;
(d) repeating step (c1) until all the selected sensing points in the sensing frame have been taken as the center point of the detection window for scanning; and
(e) when the accumulative number is greater than a second critical value, determining the selected sensing points of the current sensing frame are generated under a floating mode.

13. The method as claimed in claim 12, wherein
in step (b), each of entire sensing points of the sensing frame is taken as a center point of the detection window for scanning; and
in step (d), the step (c1) is kept repeating until entire sensing points in the sensing frame have been taken as the center point of the detection window for scanning.

14. The method as claimed in claim 12 further setting up a second floating margin being less than the first floating margin before proceeding step (c1), wherein in step (c1) determining whether a negative sensing value falls within the second floating margin and the first floating margin, and when positive, proceeding step (c2).

15. The method as claimed in claim 13 further setting up a second floating margin being less than the first floating margin before proceeding step (c1), wherein in step (c1) determining whether a negative sensing value falls within the second floating margin and the first floating margin, and when positive, proceeding step (c2).

16. The method as claimed in claim 12 further setting up a second grounding margin being greater than the first grounding margin, wherein in step (c2) determining a count of other sensing points in the detection window having the sensing values fall within the first grounding margin and the second grounding margin.

17. The method as claimed in claim 13 further setting up a second grounding margin being greater than the first grounding margin, wherein in step (c2) determining a count of other sensing points in the detection window having the sensing values fall within the first grounding margin and the second grounding margin.

18. The method as claimed in claim 14 further setting up a second grounding margin being greater than the first grounding margin, wherein in step (c2) determining a count of other sensing points in the detection window having the sensing values fall within the first grounding margin and the second grounding margin.

19. The method as claimed in claim 15 further setting up a second grounding margin being greater than the first grounding margin, wherein in step (c2) determining a count of other sensing points in the detection window having the sensing values fall within the first grounding margin and the second grounding margin.

20. The method as claimed in claim 14, wherein the first floating margin is less than a negative noise threshold.

21. The method as claimed in claim 15, wherein the first floating margin is less than a negative noise threshold.

22. The method as claimed in claim 16, wherein the first grounding margin is greater than a positive noise threshold.

23. The method as claimed in claim 17, wherein the first grounding margin is greater than a positive noise threshold.

24. The method as claimed in claim 12, wherein the first critical value is not less than two, and the second critical value is not less than two.

25. The method as claimed in claim 13, wherein the first critical value is not less than two, and the second critical value is not less than two.

26. The method as claimed in claim 14, wherein the first critical value is not less than two, and the second critical value is not less than two.

27. The method as claimed in claim 15, wherein the first critical value is not less than two, and the second critical value is not less than two.

28. The method as claimed in claim 16, wherein the first critical value is not less than two, and the second critical value is not less than two.

29. The method as claimed in claim 17, wherein the first critical value is not less than two, and the second critical value is not less than two.

\* \* \* \* \*